Patented Oct. 10, 1950

2,524,802

UNITED STATES PATENT OFFICE 2,524,802

HYDROXYBENZENESULFONAMIDOPYRIDA- ZINES AND PREPARATION OF SAME

Martin E. Hultquist, Bound Brook, N. J., and Yellapragada SubbaRow, deceased, late of Pearl River, N. Y., by Aloysius J. Bryant, administrator, South Nyack, N. Y., assignors to American Cyanamid Company, New York, N. Y., a corporation of Maine No Drawing. Application January 7, 1949, Serial No. 69,827

6 Claims. (Cl. 260—250)

This invention relates to new and useful sulfonamides and to methods of preparing the same.

It has been discovered that certain p-hydroxybenzenesulfonamidopyridazines possess unexpected anti-viral activity, particularly in the neurotropic virus diseases and may, therefore, become important drugs in the treatment of these and related diseases. The new compounds of the present invention may be represented by the general formula:

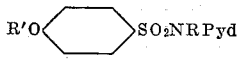

in which R represents hydrogen or an aliphatic, aralkyl or heterocyclic radical, Pyd represents a pyridazinyl radical attached to the amide nitrogen by a carbon in the heterocyclic ring at either the 3 or 4 position and R' represents hydrogen or an acyl group. The pyridazinyl radical may bear one or more substituent radicals at the remaining positions such as alkyl, aryl, aralkyl, chloro, amino and the like, or it may form a part of a condensed heterocyclic system.

The hydrogen atom of the phenolic —OH radical as well as that attached to the amide nitrogen where R equals hydrogen are acidic in nature and may be replaced by simple neutralization or otherwise with a cationic radical of a metal or organic base. Such salts are of particular value especially in that the solubility of the compound is affected thereby, usually increased. Obviously such salts are included with the scope of the present invention.

The new p-hydroxybenzenesulfonamido pyridazines may be prepared by several distinct methods, the more important of which will be described in the specific examples which follow. The preferred method is by the hydrolysis of a suitable ester of a p-hydroxybenzenesulfonamido pyridazine under either acidic or alkaline conditions whereby the —OH group is formed in the reaction. These esters which have the general formula

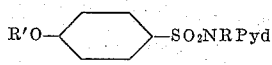

R' being an acyl radical, are believed to be new and are intended to be included within the scope of the invention. These esters are valuable per se as drugs since they may be hydrolyzed in the system.

To prepare the new acyl compounds of the present invention several methods are available. A preferred method involves the condensation of an appropriate benzene sulfonyl halide with an amino pyridazine, in accordance with the following equation:

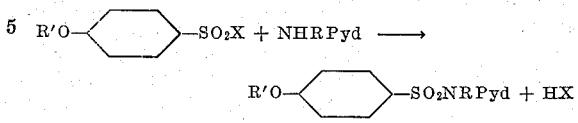

In the above R' is an acyl radical such as benzoyl, acetyl, furoyl, tosyl, carbethoxy or the like which may later be removed by hydrolysis. X is a halogen, preferably chlorine but if desired fluorine or bromine, Pyd is a pyridazinyl radical such as mentioned above attached by a carbon atom of the pyridazine ring.

To prepare intermediates in which R is an organic radical of the kind mentioned above, secondary amines such as 2-N-(beta-hydroxyethyl)-amino, 2-(N-methylamino) pyridazines and the like are employed in the reaction.

The preferred method of effecting the condensation is to bring together the reactants shown in the above equation at 0° to 100° C. until condensation is completed. It is preferred that the condensation be conducted with the reactants dissolved or suspended in a tertiary nitrogen base such as pyridine or in an organic solvent containing a basic compound such as sodium carbonate or trimethylamine as acid acceptor or in an aqueous solution containing a substance which will react with the hydrohalide acid formed during the reaction and prevent it from interfering with the reaction.

Hydrolysis of the resulting compounds to convert the group R'O to HO— can be effected over a wide range of conditions. The temperature for the hydrolysis may range from about 0° to 150° C. with the preferred temperatures being between 50° and 100° C., but this may vary with the nature of the compound being hydrolyzed. Sodium hydroxide at a concentration of approximately 10% and in slight molecular excess, usually about 1 mol, is preferred. Other alkaline hydrolyzing agents including potassium hydroxide, barium hydroxide, calcium hydroxide, trimethylbenzylammonium hydroxide or other quaternary hydroxides, ammonia and the like may also be used. Conversion of the group R'O— to HO— can also be effected by hydrolysis under acidic conditions using hydrochloric acid, sulfuric acid or other known acid hydrolyzing agents.

The time for completion of the hydrolysis depends on several factors including temperature, concentration of the hydrolyzing agent, nature of the compounds, etc. Using, for example, sodium hydroxide at 10% concentration and at a temperature of 75° to 95° C. the hydrolysis is completed in about one hour.

Although hydrolysis is usually conducted under essentially aqueous conditions, the water may be replaced in part or largely with water-miscible solvents such as alcohol. The presence of an inert water immiscible organic solvent in the reaction mixture is not precluded and, in fact, may offer advantages in some cases.

A distinct method of preparing the compounds of the present invention involves the use as starting material one of the known p-aminobenzenesulfonamido pyridazines. This process involves diazotization of the p-amino-group on the benzene ring followed by decomposition of the diazo compound under carefully controlled conditions so that a hydroxy group is formed. In general, the diazotization is carried out in the customary manner at 0° to 25° C. in 5% to 20% sulfuric acid using a slight excess of the theoretical amount of sodium nitrite. When the diazotization is complete the solution is heated to 50° to 80° C. to cause decomposition to take place. A flash decomposition carried out by passing the solution through a hot tube or through a steam gun is quite successful. A large excess of sulfuric acid may be used in the process, varying from 2 mols upwards. Decomposition is usually complete in 15 to 20 minutes at 80° C. Other acids such as hydrochloric, acetic, phosphoric and the like may, of course, be used to replace the sulfuric, if desired.

The invention will now be illustrated by the preparation of a representative p-hydroxybenzenesulfonamido pyridazine in the following example. All parts are by weight unless otherwise indicated.

1 gram of 3-amino-6-methylpyridazine (Overend and Wiggins, J. Chem. Soc. (1947), 239) is mixed with 5 cc. of dry pyridine and heated to 45° C. To this is slowly added 3.2 g. of p-tosyloxybenzenesulfonyl chloride, causing a somewhat exothermic reaction to take place. This mixture is then heated at approximately 65° for 45 minutes, cooled, and poured into water, resulting in the separation of an oil which soon crystallizes. This is filtered off and dissolved in cold dilute sodium hydroxide solution, leaving a small amount of insoluble material which is removed by filtration. The product is then reprecipitated with dilute acid. Upon recrystallization from alcohol, N - (6 - methyl - 3 - pyridazinyl) - 1 - p-tosyloxybenzene-4-sulfonamide is obtained as white crystals melting at 188–188.5° C.

N - (6 - methyl - 3 - pyridazinyl) - 1 - p - tosyloxybenzene-4-sulfonamide, 0.76 g., is mixed with 2.6 cc. of 10% sodium hydroxide solution and heated on the steam bath for one hour. After cooling, the resultant clear solution is neutralized with acid, resulting in the separation of an oil which soon crystallizes. This is purified by repeated recrystallization from water, yielding white shiny plate of N-(6-methyl-3-pyridazinyl)-1-phenol-4-sulfonamide melting at 172°–173.5°.

Analysis: Calcd. for $C_{11}H_{11}O_3N_3S$: C, 49.8: H, 4.16; N, 15.9; S, 12.1. Found: C, 49.16; H, 4.29; N, 15.9; S, 11.9.

In accordance with the above-disclosed methods, other p-hydroxybenzenesulfonamidopyridazines are prepared such as:

N-(3-pyridazinyl)-1-phenol-4-sulfonamide
N-(4-pyridazinyl)-1-phenol-4-sulfonamide
N - (6 - methyl - 4 - pyridazinyl) - 1 - phenol 4-sulfonamide.
N - (4,5,6 - trimethyl - 3 - pyridazinyl) - 1-phenol-4-sulfonamide
N - (6 - phenyl - 3 - pyridazinyl) - 1 - phenol-4-sulfonamide
3,4 - di(p - hydroxybenzenesulfonamido) 5,6 diphenylpyridazine
N - (6 - chloro - 3 - pyridazinyl) - 1 - phenol-4-sulfonamide
N - (5,6-dicarboxy - 3 - pyridazinyl) - 1 - phenol-4-sulfonamide
N - (4,5,6 - triamino - 3 - pyridazinyl) - 1 - phenol-4-sulfonamide using as intermediates the appropriate pyridazine amines.

These and other compounds can also be prepared from the proper sulfanilamidopyridazines by the method of diazotization and decomposition of the diazo group disclosed above.

Certain other p-hydroxysulfonamides and related compounds are set forth in applicants' copending application Serial Number 25,524 filed May 6, 1948.

What we claim is:

1. Compounds of the group consisting of those having the general formula

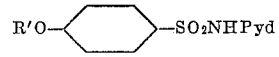

where R' is a member of a group consisting of H and acyl radicals, and Pyd is a pyridazinyl radical, and salts of said compounds.

2. Compounds having the general formula

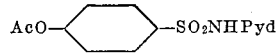

where Ac is an acyl radical and Pyd is a pyridazinyl radical, and salts of said compounds.

3. N - (6 - methyl - 3 - pyridazinyl) - 1 - p-tosyloxy-benzene-4-sulfonamide.

4. Compounds having the formula

where Pyd is a pyridazinyl radical.

5. N - (6 - methyl - 3 - pyridazinyl) - 1 - phenol-4-sulfonamide.

6. N - (4,5,6 - trimethyl - 3 - pyridazinyl) - 1-phenol-4-sulfonamide.

MARTIN E. HULTQUIST.
ALOYSIUS J. BRYANT,

*Administrator of Estate of Yellapragada SubbaRow, Deceased.*

REFERENCES CITED

The following references are of record in the file of this patent:

Beilstein: Handbuch der Organische Chemie, Vierte Auflage, vol. 6, page 153 (1923 edition).

Kermach et al.: J. Chem. Soc. (London), 1939, pages 608–610.

Weislogle: Survey of Antimalarial Drugs, volume 2, part 2, page 1450 (1946).